United States Patent
Mazyar et al.

(10) Patent No.: US 9,228,420 B2
(45) Date of Patent: Jan. 5, 2016

(54) CONFORMABLE MATERIALS CONTAINING HEAT TRANSFER NANOPARTICLES AND DEVICES MADE USING SAME

(71) Applicants: Oleg A. Mazyar, Houston, TX (US); Donald N. Horner, Spring, TX (US); Othon Do Rego Monteiro Neto, Houston, TX (US)

(72) Inventors: Oleg A. Mazyar, Houston, TX (US); Donald N. Horner, Spring, TX (US); Othon Do Rego Monteiro Neto, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 104 days.

(21) Appl. No.: 13/970,294

(22) Filed: Aug. 19, 2013

(65) Prior Publication Data
US 2015/0047841 A1     Feb. 19, 2015

(51) Int. Cl.
| | |
|---|---|
| *E21B 33/12* | (2006.01) |
| *B82Y 30/00* | (2011.01) |
| *E21B 43/08* | (2006.01) |
| *E21B 43/12* | (2006.01) |
| *E21B 43/00* | (2006.01) |
| *E21B 23/06* | (2006.01) |
| *E21B 43/10* | (2006.01) |

(52) U.S. Cl.
CPC .................. *E21B 43/08* (2013.01); *B82Y 30/00* (2013.01); *E21B 33/1208* (2013.01); *E21B 43/12* (2013.01); *E21B 23/06* (2013.01); *E21B 33/12* (2013.01); *E21B 43/00* (2013.01); *E21B 43/10* (2013.01); *E21B 43/108* (2013.01)

(58) Field of Classification Search
CPC ...................................................... B82Y 30/00
USPC ................... 977/773–777; 428/403
See application file for complete search history.

(56) References Cited

U.S. PATENT DOCUMENTS

| | | | |
|---|---|---|---|
| 6,358,562 B1 * | 3/2002 | Vollath et al. ................. | 427/228 |
| 2006/0036045 A1 * | 2/2006 | Wilson et al. ................. | 525/452 |
| 2008/0272331 A1 * | 11/2008 | Mohapatra et al. ............. | 252/70 |
| 2008/0296023 A1 * | 12/2008 | Willauer ........................ | 166/302 |
| 2010/0012267 A1 * | 1/2010 | Lalli et al. .................. | 156/273.1 |
| 2011/0022148 A1 * | 1/2011 | Ruane et al. ................. | 623/1.1 |
| 2011/0039967 A1 * | 2/2011 | Wilson et al. ................. | 521/164 |
| 2011/0173971 A1 * | 7/2011 | Mather et al. .................. | 60/528 |
| 2011/0305889 A1 * | 12/2011 | Weigel et al. ................. | 428/212 |
| 2013/0062067 A1 * | 3/2013 | Guest et al. ................... | 166/309 |
| 2014/0084205 A1 * | 3/2014 | Singh et al. ................... | 252/74 |

FOREIGN PATENT DOCUMENTS

WO     WO 2006/135384     * 12/2006

OTHER PUBLICATIONS

Sagoff, Jared; "New nanoparticle technology cuts water use, energy costs," Argonne National Laboratory, http://www.anl.gov/articles/new-nanoparticle-technology-cuts-water-use-energy-costs, Apr. 11, 2012, p. 1-3.

* cited by examiner

*Primary Examiner* — Zakiya W Bates
*Assistant Examiner* — Joseph Defazio
(74) *Attorney, Agent, or Firm* — Cantor Colburn LLP

(57) ABSTRACT

In one aspect, a method of forming a shape conforming material is disclosed that in one non-limiting embodiment may include: providing a base shape memory material having a glass transition temperature; and adding a selected amount of heat transfer nanoparticles to the base shape conforming material to provide the shape conforming material. In one aspect, the heat transfer nanoparticles include a core and a shell, wherein the core has a melting point below the glass transition temperature of the base shape memory material and the melting point of the shell.

20 Claims, 5 Drawing Sheets

CONFORMABLE MATERIALS CONTAINING HEAT TRANSFER NANOPARTICLES AND DEVICES MADE USING SAME

BACKGROUND

1. Field of the Disclosure

This disclosure relates generally to apparatus and method for completing wellbores that utilize one or more shape conformable devices or members, including, but not limited to, packers, sand screens and inflow control devices.

2. Background of the Art

Wellbores are drilled in subsurface formations for the production of hydrocarbons (oil and gas). Wells often extend to depths of more than 15,000 feet. Many such wellbores are deviated or horizontal. After a wellbore is formed, a production string is installed therein for efficient production of the hydrocarbons from subsurface formations. The production string may be installed in an open hole or a cased hole and it typically includes a tubing that extends from the surface to the wellbore depth. A variety of devices are placed inside and around the tubing for efficient production of hydrocarbons from the subsurface formations. Some of these devices may utilize materials or members that expand when heated. Such materials are generally referred to herein as "conformable materials" and the devices that utilize such materials as conformable devices. Such devices are installed on the production string in their unexpanded or compressed state or form and they expand to their intended downhole form when heated in the wellbore by fluid in the wellbore or by artificial means. Such devices include, but are not limited to, packers, sand screens, seals and certain flow control devices. Shape memory materials or swellable materials are utilized as conformable or expandable materials in devices for use in wellbore ("downhole devices"). A shape memory material has a glass transition temperature and when such a material is heated to or above such temperature, it expands, and can then be shaped into a desired expanded shape. The shape memory member may then be compressed to a desired compressed shape or state from its desired expanded shape while the temperature is at or above its glass transition temperature. If the temperature is reduced below the glass transition temperature while the member is in the compressed shape, it will retain remain in the compressed state until heated to or above its glass transition temperature. The member will expand to its desired expanded state after it remains heated for a certain time period. A swellable material expands when exposed to a heated fluid, such as oil and/or water.

A device or a member utilizing such a shape memory material may be placed or deployed in a wellbore in its initial shape. If the temperature of such a member increases to or above its glass transition temperature for a sufficient time period, it will expand to its original expanded shape. The required heat may be provided by any suitable method or mechanism. Typically, shape memory materials are heated in the wellbore by supplying a heated fluid. However, when the supply of the heated fluid is stopped, the shape memory material temperature falls to the temperature of the wellbore, which typically is below its glass transition temperature and thus ceases the expand.

Deployment rates of conformable devices can vary with the increase in temperature. Therefore, it is beneficial if the conformable devices or members retain their temperature above the onset deployment temperature of the conformable materials in the downhole environment for a period of time after the external heat supply has been stopped to ensure that the conformable device has expanded to its desire expanded shape.

The disclosure herein provides materials that contain a shape memory material and heat transfer nanoparticles that store thermal energy when external heat energy is supplied to such materials and transfer such stored heat energy to the shape memory material after the external heat energy supply has been stopped and devise that utilize such materials.

SUMMARY

In one aspect, a method of forming a shape conforming material is disclosed that in one non-limiting embodiment may include: providing a base shape memory material having a glass transition temperature; and adding a selected amount of heat transfer nanoparticles to the base shape conforming material to provide the shape conforming material. In one aspect, the heat transfer nanoparticles include a core and a shell, wherein the core has a melting point below the glass transition temperature of the base shape memory material and the melting point of the shell.

In another aspect, an apparatus for use in wellbore is disclosed that in one non-limiting embodiment may include a device having a shape conforming member that includes a base shape memory material having a glass transition temperature and a selected amount heat transfer nanoparticles, wherein each nanoparticle includes a shell and a core therein that is configured to melt within the shell to store heat energy, and wherein the shape conforming material in the device is in a compressed shape obtained by compressing the shape conforming material from an expanded shape at or above the glass transition temperature.

Examples of the more important features of a devices or members containing shape conformable materials for use in wellbores have been summarized rather broadly in order that the detailed description thereof that follows may be better understood, and in order that the contributions to the art may be appreciated. There are, of course, additional features that will be described hereinafter and which will form the subject of the claims.

BRIEF DESCRIPTION OF THE DRAWINGS

For a detailed understanding of the apparatus and methods disclosed herein, reference should be made to the accompanying drawings and the detailed description thereof, wherein like elements have generally been given like numerals and wherein.

DESCRIPTION OF EXEMPLARY EMBODIMENTS

Figure 1:
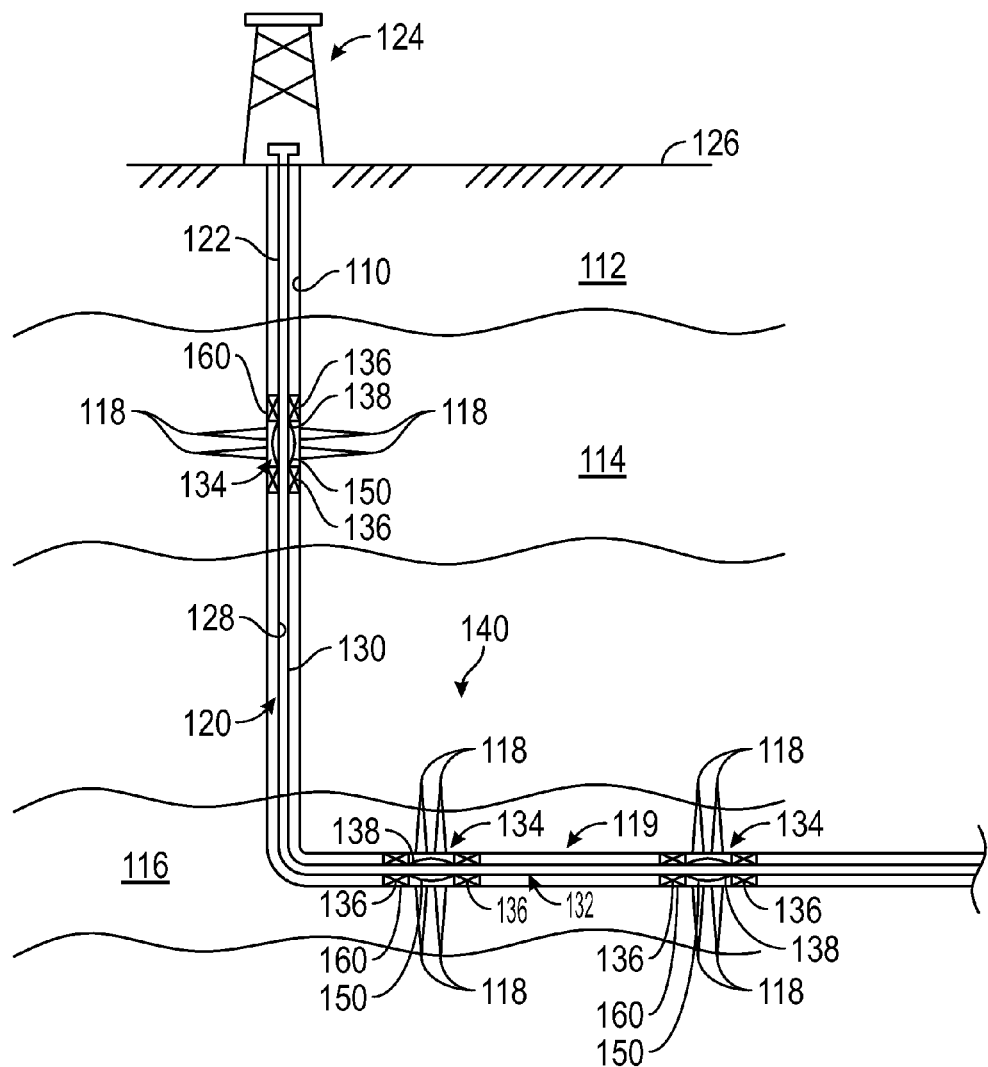
FIG. 1 is a schematic line diagram of an exemplary wellbore system that includes an exemplary multi-zone wellbore production string deployed in a wellbore, which production string includes one or more shape conforming devices made according to one or more non-limiting embodiments of the disclosure.

FIG. 1 shows an exemplary wellbore 110 that has been drilled through the earth formation 112 and into a pair of production formations or reservoirs 114, 116 from which it is desired to produce hydrocarbons. The wellbore 110 is cased wellbore lined with metal casing. A number of perforations 118 penetrate and extend into the formations 114, 116 so that production fluids 140 may flow from the formations 114, 116 into the wellbore 110. The wellbore 110 has a deviated or substantially horizontal leg 119. The wellbore 110 has a production string or assembly, generally indicated at 120, disposed therein by a tubing string 122 that extends downwardly from a wellhead 124 at the surface 126. The production assembly 120 defines an internal axial flow bore 128 along its length. An annulus 130 is defined between the production assembly 120 and the wellbore casing. The production assembly 120 has a deviated, generally horizontal portion 132 that extends along the deviated leg 119 of the wellbore 110. Production zones 134 are shown positioned at selected locations along the production assembly 120. Each production zone 134 may be isolated within the wellbore 110 by a pair of packer devices 136. Although only three production zones 134 are shown in FIG. 1, there may, in fact, be a large number of such zones arranged in serial fashion along the horizontal portion 132.

Each production zone may 134 may include a flow control or production flow control device 138 to govern one or more aspects of a flow of one or more fluids into the production assembly 120. As used herein, the term "fluid" or "fluids" includes liquids, gases, hydrocarbons, multi-phase fluids, mixtures of two of more fluids, water, brine, engineered fluids such as drilling mud, fluids injected from the surface such as water, and naturally occurring fluids such as oil and gas. In accordance with embodiments of the present disclosure, the production control device 138 may include a number of alternative constructions of sand screen 150 and an inflow control device 160 that inhibits the flow of solids from the formations 114 and 116 into the string 120. One or more devices, including but not limited to, packers 136, production control devices 138 may include members made from conformable materials, the composition and methods of deploying such devises is described in more detail in reference to FIGS. 2-5.

Figure 2A:
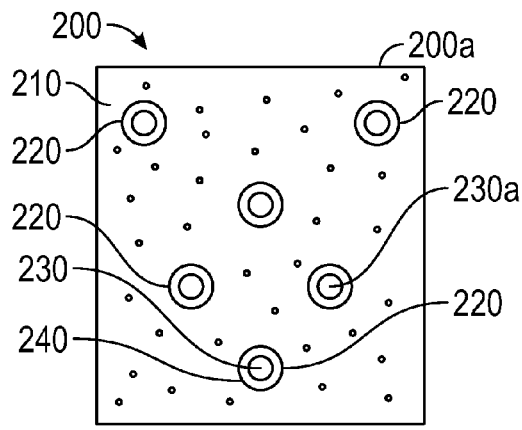
FIGS. 2A-2C show a method of making a conformable member for use in a wellbore according to one non-limiting embodiment.
Figure 2B:
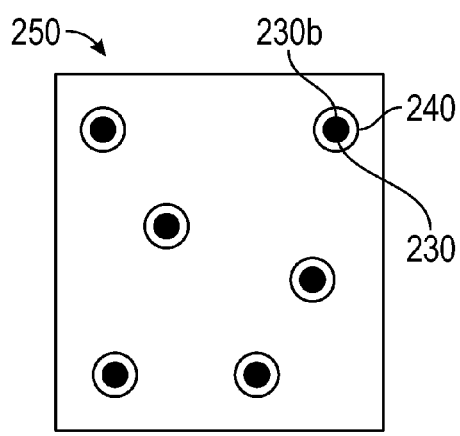

FIGS. 2A-2D show a method of making a conformable member for use in a wellbore according to one non-limiting embodiment of the disclosure. FIG. 2A shows a shape conformable material 200 having an initial shape 200A at an ambient temperature for use in forming conformable members or devices for use downhole. In one non-limiting embodiment, the material 200 may be composed of a base material 210 and a selected amount by weight or volume of heat transfer particles or elements. In one aspect the base material 210 may include one or more shape memory materials, or one or more shape memory and non-shape memory materials. Shape memory materials are known and may be open cell or closed cell materials. A shape memory material has a glass transition temperature. When such a material is heated from an initial shape to or above its glass transition temperature, it expands to a final shape. The expanded shape can then be shaped or molded into a desired or selected shape at or above the glass transition temperature. The shape memory material may then be compressed or molded to a desired compressed shape or state. If the temperature of the compressed device is reduced below the glass transition temperature, it will retain the compressed shape. If the compressed member is heated again to or above its glass transition temperature for a sufficient time period, it will expand to its desired or selected shape. Various suitable shape memory materials are known in the art and any such material or a combination thereof or a combination of one or more shape memory materials and another suitable material may be utilized as the base material 210. Shape memory materials using polyurethane are known in the art. However, any shape memory material suitable for downhole applications may be utilized for the purpose of this disclosure. In other aspects, swellable or expandable materials may also be utilized as base materials. Certain materials, such as rubbers, expand or swell when exposed to heated fluids. Some such materials expand when exposed to heated water and others when exposed to oil and still others may expand when heated to either water or oil. A swellable material expands from an initial shape to a final shape when exposed to a fluid but the volume of the material remains the same as compared to a shape memory material whose volume increases from the compressed shape to the expanded shape.

In one aspect, the heat transfer particles may be nanoparticles or micro-particles or a combination thereof. The term "nanoparticle" is used herein to denote particle having nano and micro sizes or a combination thereof. In a non-limiting embodiment, the nanoparticles include a core and a shell surrounding the core. In one aspect, the core may include a metallic material and the shell may be made from a metallic or a non-metallic material. In another aspect, the core may be bismuth and the shell made from a metallic or non-metallic material. In another embodiment, the core may be bismuth and the shell may be made from aluminum, alumina or a combination thereof. Bismuth has a melting point of 271.5° C. and density of 9.78 gm/cc at room its temperature. When solid bismuth is heated, it starts to store heat or thermal energy and its temperature rises up to its melting point. At the melting point, further introduction of heat increases the enthalpy of bismuth but its temperature remains constant until all the material has become liquid. This change in enthalpy is commonly referred to as the "enthalpy of fusion" or "heat of fusion". Once all of the bismuth has melted, further heating the liquid bismuth increases its temperature. Therefore, bismuth can be heated to a temperature above its melting point, for example 350° C., to store thermal energy, with the heat of fusion being a significant part of the total stored thermal energy. The melting point of aluminum or alumina is substantially higher than the melting point of bismuth and the steam temperature, thereby allowing the nanoparticles have bismuth as core to be heated to an elevated temperature to store thermal energy. In one aspect, the present disclosure utilizes the stored thermal energy to discharge heat to a selected section of the reservoir to decrease the viscosity of the fluids therein, such as heavy oils, typically present as bitumen.

In one aspect, the nanoparticles having a core and a shell may be made by heating nanoparticles of a core material, such as bismuth, with triethylaluminum. Triethylaluminum decomposes above 162° C., whereat the aluminum separates from the triethylaluminum compound. When the mixture of bismuth nanoparticles and triethylaluminum is heated between the decomposition temperature of triethylaluminum and melting point of bismuth, the aluminum separates from the triethylaluminum compound. The separated aluminum then attaches to the bismuth nanoparticles forming a shell around the bismuth nanoparticles, thereby providing nanoparticles having a bismuth core and an aluminum shell. Oxygen present in the environment oxidizes at least some of the aluminum to for alumina ($Al_2O_3$), thereby providing a shell that is a combination of aluminum and alumina. If the mixture is heated to just below the melting point of bismuth, it attains its maximum volume. And when the aluminum and/or alumina attaches to bismuth nanoparticles, the cores of such nanoparticles have the maximum volume. When such core-shell particles are cooled down, bismuth core shrinks while the aluminum/alumina shell shrinks, but less than the core. When such shell-core nanoparticles are heated to or above the melting point of bismuth, the core expands to its maximum volume within the shell until it melts and then shrinks a bit because the density of the molten bismuth (10.05 gms/cc at the melting point) is greater than the density of the solid bismuth (9.78 gms/cc at room temperature). After bismuth shrinks at the melting point, further heating of core starts the liquid bismuth core to expand. To prevent cracking of the shell due to the expansion of the molten core, the temperature is not exceeded beyond when the volume of the molten core becomes equal to the maximum volume of the solid core when the core was contained within the alumina/aluminum shell. Another embodiment of a phase change heat transfer particles may comprise a core made of a commercially known material referred to as "Polywax," which may include a polyethylene. The shell may comprise Nickel. In one aspect, a nanoparticle may include a Polywax core, formed as a sphere of polyethylene, and coated with a uniform layer of electroless Nickel shell. The coating or shell is continuous and porosity-free in order to confine the Polywax when it melts. Due to the difference in the thermal expansion coefficient of the Polywax core and the Nickel shell, the shell thickness is chosen to withstand the temperature oscillations during formation of the device containing such a material. This minimum thickness is a function of the thermal expansion coefficients and the mechanical properties of the core and the shell. Stress distribution calculation of the core (for example Polywax) and the shell (for example Nickel) may be used to determine the thickness of the shell. The dimensions of the Polywax-Nickel particles may exceed 2 microns. In addition to electroless deposition, the shell in these may be produced by Physical Vapor Deposition or Chemical Vapor Deposition processes and variations thereof. In this case the particles can be suspended in a fluid bed or in a fluidized bed, or in a vibrating or rotating table, where they are free to rotate while the outer layer is deposited.

Figure 2C:
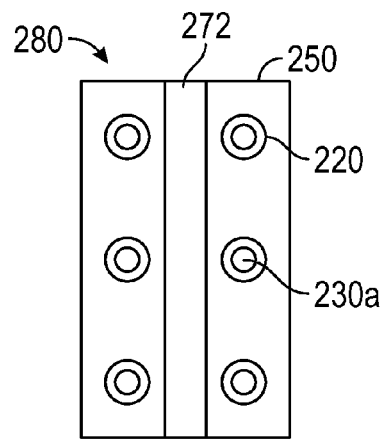

Referring back to FIG. 2A, to make the material 200, an amount of the nanoparticles 220 may be mixed with the base material 210 in a manner that provides uniform or substantially uniform distribution of nanoparticles 220 in the material 210. In FIG. 2A, the nanoparticles 220 are shown to contain core 230 and shell 240. The core in its solid state is shown by an unfilled circle 230a. To form an expandable device using the conformable material 200, the mixture 200 may be heated to or above the glass transition temperature of the base material 210, causing the material 200 to expand or swell. The expanded material may then be molded to attain a desired shape, such as shape 250 shown in FIG. 2B. If the temperature of the heated material 200 is above the melting point of the core 230, the core will attain a molten state. The expanded shape 250 may then be compressed into a desired shape compressed shape for use in a wellbore, such as a packing member 280 having a bore 272 therethrough, as shown in FIG. 2C. The device 280 is then allowed to cool to a temperature below the glass transition temperature of the base material 210 so that it will remain in the compressed shape 280 until heated to or above the glass transition temperature of the base material 210.

Figure 3A:
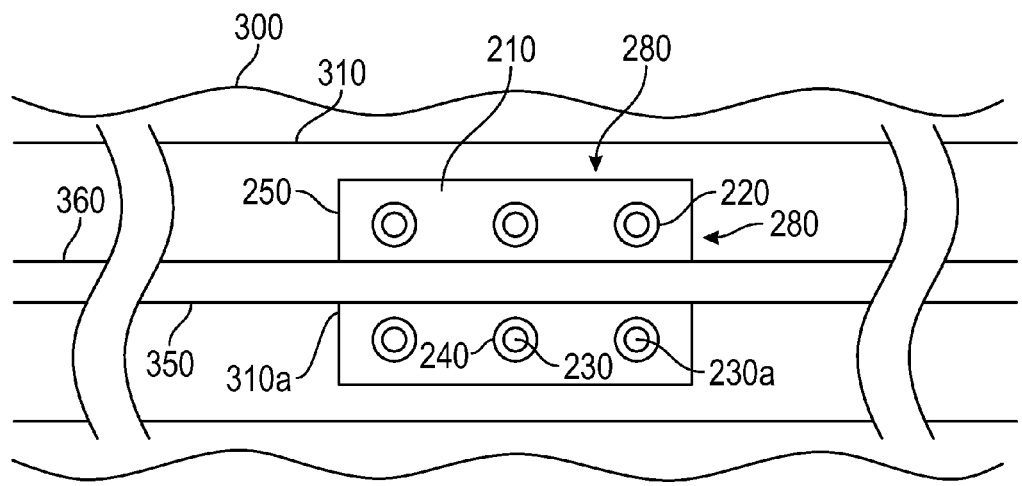
FIGS. 3A-3C show a method of deploying an exemplary shape conforming device into a wellbore by supplying a heated fluid to heat the device, according to one non-limiting embodiment of the disclosure.
Figure 3B:
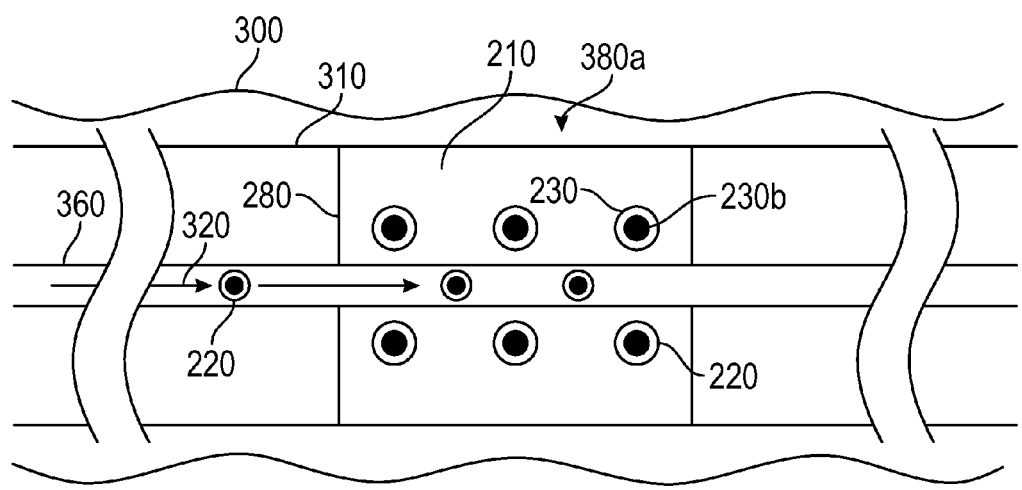
Figure 3C:
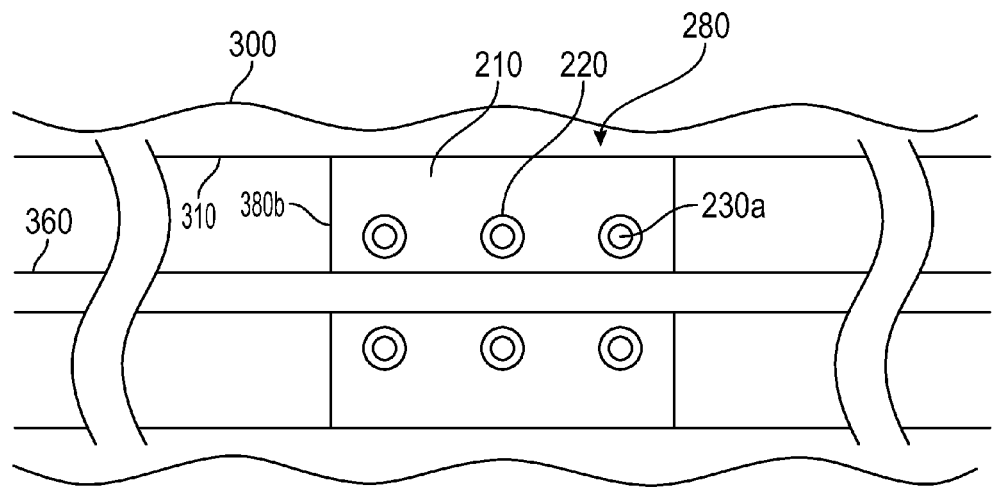

FIGS. 3A-3C show an exemplary method of using the device 280 shown in FIG. 2D in a wellbore 300, lined with a casing 310. The device 280, in one non-limiting embodiment, may be placed around a tubing 350 of a production string 360. The production string 360 may then be deployed inside a casing 310 so that the device 280 is located at a selected depth 310a in the wellbore 300. After placing the device 280 in the wellbore 300, a heated fluid 320 may be supplied to heat the device 280 to or above the glass transition temperature of the base material 210, which temperature may be above the melting point of the cores 220 in the device 280. Heating the material 250 causes the base material 210 to expand toward the intended expanded shape as shown by 380a in FIG. 3B. In one aspect, the temperature of the fluid is higher than the melting temperature of the core 230 to enable the cores 230 to melt and store heat energy. Once the fluid 320 supply is stopped, the heat supplied by the fluid 320 to the material 210 stops. However, the molten core still continues to supply the stored heat to the base material 210 for a period of time after the fluid supply has been turned off, which may ensure further expansion of the device 280 and thus ensuing full expansion of the device 280, as shown by shape 380b in FIG. 3C. When the temperature of the cores 230 drops below their melting point, they solidify, as shown by empty circles 230a in FIG. 3C. In another aspect, nanoparticles may be added into the fluid 320 to heat the shape conformable device 280 in the wellbore.

Figure 4:
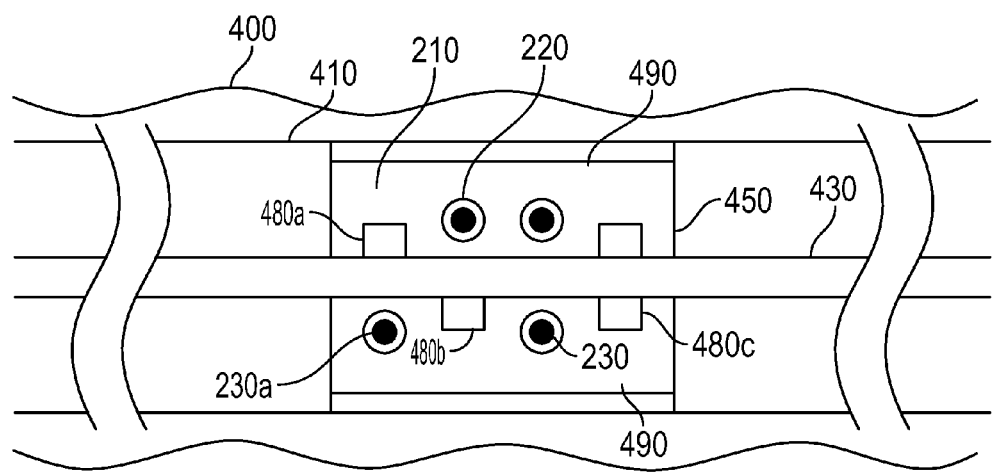
FIG. 4 shows an alternative method of heating the shape conforming device in a wellbore.

FIG. 4 shows an alternative method of heating the shape conforming device 450 formed using a shape conforming material 250. FIG. 4 show the device 450 placed outside a tubing 430 placed inside a casing 410 in a wellbore 400. The device 280 includes shape conforming material 250 that includes a base shape memory material 210 and heat transfer nanoparticles 220, each having a core 230 and a shell 240 as described in reference to FIG. 2A. The device 450 further includes one or more exothermic heat generating elements therein, such as elements 480a, 480b, 480c etc. The heat generating elements 480a-480c may be suitably activated downhole to generate sufficient heat to heat the device 450 to or above the glass transition temperature of the base material 210 to cause the device 450 to expand to the expanded shape 490 and to cause the cores 230 to melt and store heat for continued heating of the base material 210 after the exothermic heat generation has stopped. The solid circles 230b denote molten core.

Figure 5:
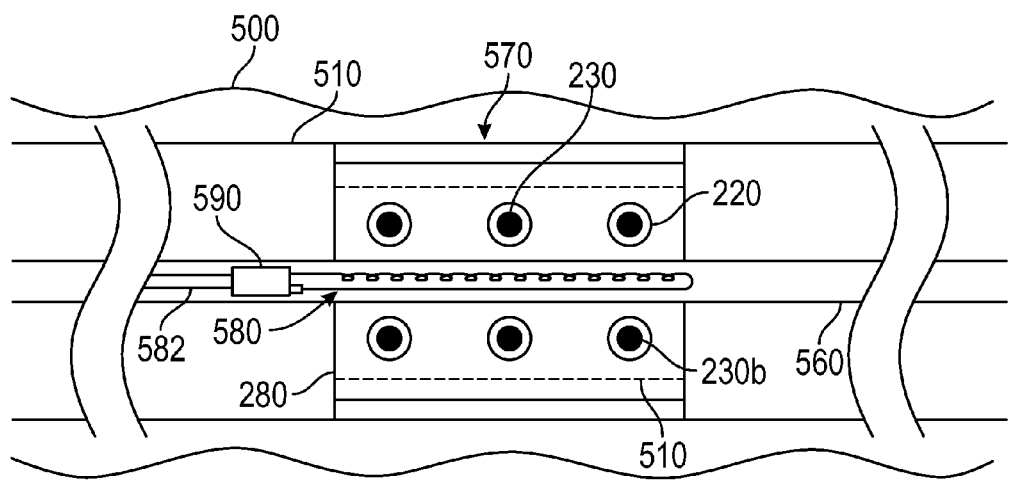
FIG. 5 shows yet another method of heating the shape conforming device in a wellbore.

FIG. 5 shows yet another method of heating a shape conforming device, such as device 280 shown in FIG. 3A. In FIG. 5, the device 280 is placed on a tubing 560 and deployed in a wellbore 500 lined with a casing 510. The device 280 includes an expandable base material 210 and heat transfer nanoparticles 220, each having a solid core 230. To heat and expand the device 280 in the wellbore 500, a heating device or element 580 may be conveyed into the wellbore 500 by a conveying member 582, such as wireline or coiled tubing, and located proximate to the shape conforming device 280, as shown in FIG. 5. The heat element 580 may then be activated from a power source at the surface and/or a battery 590 carried by the conveying member 582. To set or expand the device 280, the heating element 580 generates sufficient heat to heat the base material 210 in the device 280 to or above its glass transition temperature and the core to above its melting point so as to cause the base material to expand to attain the expanded shape 570 and for the cores 230 to store heat energy. The solid circles 230b denote molten core. The heating element 580, in one non-limiting embodiment, may be a heating coil for conduction. If the core material is a metal, such as bismuth, the heating element 580 may be an induction element. Any other method of heating the device 280 may also be utilized for the purpose of this disclosure. In aspects, the induction element may be active continuously or cyclically to heat the core material. Such a method may be utilized to maintain the core temperature at a selected temperature or within a selected temperature range of uniform heating of the base material. In any the methods described herein, the core may be heated to a temperature so that the temperature of the shell and thus the nanoparticle itself is below the degradation temperature of the base material.

The foregoing disclosure is directed to the certain exemplary embodiments and methods. Various modifications will be apparent to those skilled in the art. It is intended that all such modifications within the scope of the appended claims be embraced by the foregoing disclosure. The words "comprising" and "comprises" as used in the claims are to be interpreted to mean "including but not limited to". Also, the abstract is not to be used to limit the scope of the claims.

The invention claimed is:

1. A method of making a shape conforming material for use in a wellbore, comprising:
providing a shape memory material having a glass transition temperature that is above a temperature of the wellbore; and
adding a selected amount of heat transfer nanoparticles to the shape memory material to provide the shape conforming material, wherein the heat transfer nanoparticles include a core and a shell, wherein the core stores heat energy when the shape memory material is heated by a heat source above its glass transition temperature and supplies heat to the shape memory material for expansion of the shape memory material after the heat source is removed.

2. The method of claim 1, wherein the core has a melting point below the glass transition temperature of the shape memory material and the melting point of the shell.

3. The method of claim 2, wherein the core includes a material selected from a group consisting of: bismuth; a eutectic salt; a polymer; tin; lead; a salt hydrate; a metallic material; a wax; an oil; a fatty acid; and a polyglycol.

4. The method of claim 2, wherein the shell includes a material selected from a group consisting of: a metal; carbon; silica; graphene; graphite; a diamond-like carbon; carbon nitride; boron nitride; iron; nickel; cobalt and zinc; a metal oxide; a nitride; a carbide; and a polymer.

5. The method of claim 2, wherein the core size is between 1 nm and 40 nm and thickness of the shell is at least 0.05 nm.

6. A method of forming an apparatus for use in a wellbore, comprising:
providing a shape conforming material that contains a base shape memory material having a glass transition temperature above a wellbore temperature and a selected amount of heat transfer nanoparticles, wherein the heat transfer nanoparticles have a core and a shell, wherein the core stores heat energy when heat is applied to the shape memory material from a heat source and supplies heat to the shape memory material for expansion of the shape memory material after the heat source is removed; and
forming the apparatus for use in the wellbore by heating the shape conforming material above the glass transition temperature.

7. The method of claim 6, wherein the apparatus is selected from a group consisting of: a packer; a sand screen; and an inflow control device.

8. The method of claim 6 further comprising incorporating the apparatus into a string for deployment into the wellbore for performing an operation selected from a group consisting of: production of a fluid from a formation surrounding the wellbore; and treating a formation surrounding the wellbore.

9. The method of claim 6, wherein the core has a melting point below the glass transition temperature.

10. The method of claim 6, wherein forming the apparatus comprises:
heating the shape conforming material to or above the glass transition temperature to expand the shape conforming material to attain an expanded shape;
compressing the shape conforming material from the expanded shape to a compressed shape; and
reducing the temperature of the compressed shape to a temperature below the melting point of the core.

11. The method of claim 6, wherein the core includes a material selected from a group consisting of: bismuth; a eutectic salt; a polymer, tin, lead, a salt hydrate, a metallic material; a wax, an oil, a fatty acid; a polyglycol; and a combination thereof.

12. The method of claim 6, wherein the shell includes a material selected from a group consisting of a metal; carbon; a polymer; silica; graphene; graphite; a diamond-like carbon; carbon nitride; boron nitride; iron; nickel; cobalt and zinc; a metal oxide; a nitride; a carbide; and a polymer that is stable at a selected temperature.

13. An apparatus for use in a wellbore, comprising:
a device having a shape memory member that includes a base shape memory material having a glass transition temperature above a wellbore temperature and a selected amount heat transfer nanoparticles, wherein each nanoparticle includes a shell and a core therein that is configured to melt within the shell to store heat energy when heat is applied to the shape memory material from a heat source and to supply heat to the shape memory material for expansion of the shape memory material after the heat source is removed, and wherein the shape conforming material in the device is in a compressed shape previously obtained by compressing the shape conforming material from an expanded shape at or above the glass transition temperature.

14. The apparatus of claim 13, wherein:
the shape memory material expands to the expanded shape when heated to or above the glass transition temperature; and
the core melts within the shell at a temperature below the glass transition temperature of the shape memory material to store heat energy.

15. The apparatus of claim 13, wherein:
the core includes a material selected from a group consisting of: bismuth; a eutectic salt; a polymer; tin; lead; a salt hydrate; a metallic material; a wax; an oil; a fatty acid; a polyglycol; and a combination thereof; and
the shell includes a material selected from a group consisting of: a metal; carbon; a polymer; silica; graphene; graphite; a diamond-like carbon; carbon nitride; boron nitride; iron; nickel; cobalt and zinc; a metal oxide; a nitride; a carbide; and a polymer that is stable at a selected temperature.

16. The apparatus of claim 13, wherein the selected amount of the heat transfer nanoparticles is between 1% to 20% by weight or volume of the base shape memory material.

17. The apparatus of claim 13, wherein the device is carried by a tubular member of a string for deployment of the device into a wellbore.

18. The apparatus of claim 13, wherein the device is one of a: packer; sand screen; a flow control device for controlling flow of a fluid therethrough and a combination thereof.

19. A system for use in a wellbore, comprising:
a string containing a tubular and a device for performing an operation in the wellbore, wherein the device includes a shape conforming member that includes a base shape memory material having a glass transition temperature above a temperature of the wellbore and a selected amount of heat transfer nanoparticles, wherein each nanoparticle includes a shell and a core therein that is configured to melt within the shell to store heat energy when heat is applied to the shape memory material from a heat source and to supply heat to the shape memory material for expansion of the shape memory material after the heat source is removed, and wherein the shape conforming material in the device is in a compressed shape obtained by compressing the shape conforming material from an expanded shape at or above the glass transition temperature prior to placing the device in the wellbore.

20. A method of making a shape conforming device, comprising:

providing a base material that expands when exposed to a heated fluid;

adding a selected amount of heat transfer nanoparticles to the base shape memory material to provide a shape conforming material, wherein each heat transfer nanoparticle includes a shell and a core, wherein the core melts within the shell to store heat energy when heat is applied to the shape memory material from a heat source and to supply heat to the shape memory material for expansion of the shape memory material after the heat source is removed; and using the shape conforming material to form the shape conforming device.

* * * * *